United States Patent [19]

Schmidle et al.

[11] 4,182,848

[45] Jan. 8, 1980

[54] PHOTOCURABLE COMPOSITIONS

[75] Inventors: Claude J. Schmidle; Robert Barclay, Jr., both of Trenton, N.J.

[73] Assignee: Thiokol Corporation, Newtown, Pa.

[21] Appl. No.: 944,119

[22] Filed: Sep. 20, 1978

Related U.S. Application Data

[62] Division of Ser. No. 720,531, Sep. 7, 1976.

[51] Int. Cl.$^2$ .......................... C08F 28/04; C08F 2/48
[52] U.S. Cl. ............................... 528/376; 204/159.15; 204/159.22; 427/54; 428/419; 428/521
[58] Field of Search ...................... 204/159.15, 159.22; 528/376

[56] References Cited

U.S. PATENT DOCUMENTS

| | | | |
|---|---|---|---|
| 3,010,923 | 11/1961 | Ikeda | 260/23 |
| 3,225,014 | 12/1965 | D'Alelio | 204/159.22 |
| 3,809,633 | 5/1974 | Magnotta et al. | 204/159.15 |
| 3,908,039 | 12/1975 | Guthrie et al. | 204/159.15 |
| 3,931,353 | 1/1976 | Hanyuda et al. | 204/159.22 |
| 3,976,553 | 8/1976 | Larsen | 204/159.22 |

*Primary Examiner*—Walter C. Danison
*Attorney, Agent, or Firm*—Stanley A. Marcus; Royal E. Bright

[57] ABSTRACT

Novel photocurable compositions employing the addition of thiols to polymers having terminal vinyl-acetal functions, products prepared therefrom, and process for preparation thereof are disclosed. The cured products are films useful in coating floor tile, fabrics, and wooden articles.

9 Claims, No Drawings

PHOTOCURABLE COMPOSITIONS

This is a divisional of application Ser. No. 720,531 filed Sept. 7, 1976.

BACKGROUND OF THE INVENTION

This invention relates to the art of "thiol-ene" cures of polymers, that is cure of polymers by radiation induced addition of thiol functions to carbon-carbon unsaturation.

The basic principles of radiation induced thiol addition to carbon-carbon unsaturation, particularly terminal unsaturated bonds, in various molecules are reviewed by Griesbaum in Angewandte Chemie (International Edition), 9, (1970), page 273.

The use of this type of reaction in curing various polymers, including urethane polymers, to form elastomers and resins is well-known in the art. No polymers having vinyl-acetal terminal groups are known to have been cured using this method.

SUMMARY OF THE INVENTION

The invention provides a photocurable composition which comprises a polythiol and a polyene derived from a vinyl-acetal.

The tangible embodiments of this composition aspect of the invention possess the inherent applied use characteristic of being curable to tough flexible films useful as coatings for floor tile, fabrics, and wood.

A preferred embodiment of this composition aspect resides in the concept of a photocurable composition as defined hereinabove wherein the polyene is derived from vinyl-1,3-dioxolane, or vinyl-1,3-dioxane.

Another preferred embodiment resides in the concept of a photocurable composition as defined hereinabove wherein the polythiol is selected from a compound of the formula Q$-$(SH)$_m$ wherein m is at least 2 and Q is an m valent radical derived by removal of hydrogen from terminal or ring positions of straight, branched chain, or cyclic alkyl of from 2 to 20 carbon atoms, benzene, straight or branched chain alkyl-phenyl, biphenyl, phenyl-straight, branched chain, or cyclic alkylene-phenyl diphenyl-ether, straight, branched chain, or cyclic alkyl-phenyl ether, di-straight, branched chain, or cyclic alkyl ether, polyphenylene-polyether, polyphenylene-polyalkylene-polyether, polyalkylene polyether, polyester, or esters of polyols.

Still another preferred embodiment of this composition aspect of the invention resides in the concept of a photocurable composition as hereinabove defined wherin the polyene is a compound of the formula:

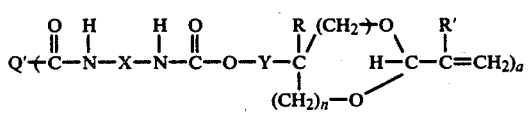

wherein Q' is an a-valent residue derived from a hydroxyl terminated polyester, polyether, polyamide, polyester polyether, or polyester-polyamide by removal of hydrogen from the hydroxyl functions; X is a divalent alkylene, or arylene linking group; Y is a covalent bond or an alkylene group of from 1 to 20 carbon atoms; R is hydrogen, alkyl of 1 to 20 carbon atoms, or haloalkyl of 1 to 20 carbon atoms; R' is hydrogen, alkyl of 1 to 20 carbon atoms, haloalkyl of 1 to 20 carbon atoms, fluoro, or chloro; n is 0 or 1 and a is a positive number greater than 1.

The invention also provides a film suitable for coating a substrate which comprises a cured film formed by treating with actinic radiation a lamina comprising a polythiol and a polyene derived from a vinyl acetal.

The invention further provides an article of manufacture consisting of a substrate coated on at least one surface with a film derived by treating a lamina coated on said surface with actinic radiation, said lamina comprising a polythiol and a polyene derived from a vinyl acetal.

The invention still further provides a method for the preparation of an article of manufacture coated on at least one surface with a cured film derived from a polythiol and a polyene derived from a vinyl acetal which comprises applying to at least one surface of a substrate a lamina comprising a polythiol and a polyene derived from a vinyl acetal: and treating said lamina with actinic radiation.

DESCRIPTION OF THE PREFERRED EMBODIMENT

In describing the preparation of the compositions of the invention, reference will first be made to the method of synthesis of a specific embodiment of the polyenes derived from a vinyl acetal, namely a 5-ethyl-5-hydroxy methyl-2-vinyl-m-dioxane terminated-toluene-diisocyanate capped hydroxy terminated polyethylene adipate having approximately 800 equivalent weight of the polyester and an NCO content of approximately 3.0% before the terminal group was introduced (I).

5-ethyl-5-hydroxy methyl-2-vinyl-m-dioxane (II) a starting material for the preparation of I may be prepared from trimethylol propane and acrolein in a reaction analogous to that described in U.S. Pat. No. 3,010,923 for the reaction of α, β, ω-triols with acrolein for the preparation of vinyl-1,3-dioxolanes.

Treatment of II with an approximately 800 equivalent weight hydroxyl terminated polyethylene adipate polyester capped with toluene diisocyanate to an NCO content of 3.0% at elevated temperature, conveniently 90° C., for a moderate reaction period, conveniently 9–10 hours, gives I.

To prepare a specific embodiment of the compositions of the invention, I, pentaerythritol tetrakis mercapto acetate, a U.V. initiator, conveniently benzophenone, an anti-oxidant, conveniently 2,6-di-tertiary-butyl-4-methyl-phenol, and, if desired, a flow control agent such as Union Carbide Corporation's UCC L-7602 are blended.

A suitable volatile solvent in sufficient proportion to adjust viscosity for convenient application may be added. Methyl ethyl ketone is a convenient solvent for this purpose.

The blended material is applied in a thin layer or lamina to the substrate to which it is desired to apply the coating and any solvent which may be present allowed to evaporate. The cast uncured film lamina is then exposed to U.V. radiation and cured.

One skilled in the art will recognize that in addition to the specific intermediate II illustrated hereinabove, it is possible to treat acrolein or acrolein substituted in the β position with hydrogen, alkyl, halo alkyl, fluoro or chloro with an α, β, ω-triol such as glycerol, 1,2,6-hexanetriol and the like, or an α, γ, ω-triol such as 1,3,6-hexanetriol and the like in addition to the trimethylol propane illustrated or such triols substituted in the β or γ position with alkyl, or halo alkyl to obtain the vinyl-m-dioxane or vinyl-1,3-dioxolane derivatives contemplated as suitable for use in the invention. Thus any 1,2,(3 or higher) or 1,3,(5 or higher)triol will be suitable.

Similarly it will be readily apparent to one skilled in the art that any hydroxy terminated polyester, polyether or polyamide may be substituted for the polymeric polyethylene adipate illustrated as a suitable prepolymer starting material.

Illustrative of suitable prepolymers will be those liquid polyesters derived from such polyhydric alcohols as: ethylene glycol, 1,3-propanediol, 1,2-propanediol, 1,3-butanediol, 1,4-butanediol, 2,3-butanediol, 1,3-pentanediol, 1,4-pentanediol, 1,5-pentanediol, 2,3-pentanediol, 2,4-pentanediol, 1,6-hexanediol, 1,5-hexanediol, 1,4-hexanediol, 1,3-hexanediol, 2,3-hexanediol, 2,4-hexanediol, 2,5-hexanediol, 1,7-heptanediol, 1,5-heptanediol, 3,5-heptanediol, 1,10-decanediol, para-xylene glycol, the bis-(β-hydroxyethylether) of hydroquinone, neopentylglycol, glycerin, pentaerythritol, trimethylolpropane, triethylolethane and the like and polycarboxylic acids such as, for example, adipic acid, oxalic acid, succinic acid, methyl adipic acid, sebacic acid, glutaric acid, pimelic acid, azelaic acid, suberic acid, phthalic acid, terephthalic acid, isophthalic acid, 1,2,4-benzene tricarboxylic acid, maleic acid, fumaric acid, itaconic acid, citraconic acid and the like, liquid polyamides derived from the reaction between polycarboxylic acids as illustrated hereinabove and polyamines such as, for example, ethylene diamine, propylene diamine, butylene diamine, pentamethylene diamine, hexamethylene diamine, phenylene diamine, tolylene diamine, xylylene diamine, 4,4'-diamino-diphenylmethane, cyclohexylene diamine, naphthylene diamine, and the like, or liquid polyester polyamides from polycarboxylic acids and amino alcohols such as amino ethanol, amino propanol, amino butanol, and the like, also polyesters prepared from lactones such as caprolactone and the like, polyhydric polyalkylene ethers such as, for example, the condensation products of an alkylene oxide such as ethylene oxide, propylene oxide, butylene oxide, amylene oxide and the like with a suitable initiator such as water or any of the polyalcohols, polyamines, or amino alcohols set forth herein.

In addition to the toluene diisocyanate illustrated hereinabove it will be obvious that the above hydroxy terminated prepolymer may be end capped with other diisocyanates as a connecting link with the hydroxy-vinyl-m-dioxanes or hydroxy-vinyl-1,3-dioxolanes. Illustrative of these are, for example, 1-methoxyphenyl-2,4-diisocyanate, 1-methyl-4-methoxyphenyl-2,5-diisocyanate. 1-ethoxyphenyl-2,4-diisocyanate, 1,3-dimethoxyphenyl-4,6-diisocyanate, 1,4-dimethoxyphenyl-2,5-diisocyanate, 1-propoxyphenyl-2,4-diisocyanate, 1-isobutyoxy-2,4-diisocyanate, 1,4-diethoxyphenyl-2,5-diisocyanate, diphenylether-2,4-diisocyanate, naphthalene-1,4-diisocyanate, 1,1'-dinaphthalene-2,2'-diisocyanate, biphenyl-2,4-diisocyanate, 3,3'-dimethylbiphenyl-4,4'-diisocyanate, 3,3'-dimethoxybiphenyl-4,4'-diisocyanate, diphenylmethane-4,4'-diisocyanate, diphenylmethane-2,4'-diisocyanate, diphenylmethane-2,2'-diisocyanate, 3,3'-dimethoxy diphenylmethane-4,4'-diisocyanate, benzophenone-3,3'-diisocyanate, ethylene diisocyanate, propylene diisocyanate, butylene diisocyanate, pentylene diisocyanate, methylbutylene diisocyanate, tetramethylene diisocyanate, pentamethylene diisocyanate, hexanethylene diisocyanate, dipropyl diisocyanate ether, heptanethylene diisocyanate, 2,2-dimethylpentylene diisocyanate, 3-methoxy-hexamethylene diisocyanate, octamethylene diisocyanate, 2,2,4-trimethylpentylene diisocyanate, 3-butoxyhexamethylene diisocyanate, 1,3-dimethylbenzene diisocyanate, 1,4-dimethylbenzene diisocyanate, 1,2-dimethylcyclohexane diisocyanate, 1,4-dimethylcyclohexane diisocyanate, 1,4-diethylbenzene diisocyanate, 1,4-dimethylnaphthalene diisocyanate, 1,5-dimethylnaphthalene diisocyanate, cyclohexane-1,3-diisocyanate, cyclohexane-1,4 diisocyanate, 1-methylcyclohexane-2,4-diisocyanate, 1-methylcyclohexane,-2,2-diisocyanate, 1-ethylcyclohexane-2,4-diisocyanate, dicyclohexylmethane-4,4'-diisocyanate, dicyclohexylmethylmethane-4,4'-diisocyanate, dicyclohexyldimethylmethane-4,4'-diisocyanate, 2,2-dimethyldicyclohexylmethane-4,4'-diisocyanate, 3,3',5,5'-tetramethyldicyclohexylmethane-4,4'-diisocyanate, 4,4'-methylene-bis(cyclohexylisocyanate), ethylidene diisocyanate, 4,4'-diphenyl diisocyanate, dianisidine diisocyanate, 1,5-naphthalene diisocyanate, m-phenylene diisocyanate, isopropylidene bis(phenyl or cyclohexyl isocyanate), 1,3-cyclopentylene diisocyanate, 1,2-cyclohexylene diisocyanate, 1,4-cyclohexylene diisocyanate, 4,4',4''-triphenylmethane triisocyanate, 1,3,5-triisocyanate benzene, phenylethylene diisocyanate, and the like.

It will in addition be obvious that the polythiol component of the composition of the invention, in addition to the pentaerythritol-tetrakis-mercaptoacetate illustrated, may be thiol analogs of any of the aforementioned polyhydroxy compounds or of the aforementioned polyhydric polyethers, polyesters, or polyamides, or polyesteramides or the ester produced by reaction of these polyalcohols with a thiol substituted carboxylic acid. Illustrative of these compounds are ethane dithiol, propane dithiol, 1,1'-dimercaptodiethyl ether, bis-(2-mercaptoethyl)-formal,ethylene glycol dimercaptopropionate and the like.

As stated above the compositions of the invention contemplate the optional inclusion, in addition to the aforementioned vinyl acetal and poly thiol components, of various standard additives well-known to the art for the purposes of viscosity control, case of processing, storage stability and the like. No one or combination of these is particularly essential to making or using the invention, the only real limitation being that they be materials which one skilled in the art would expect to not interfere with the radiation cure by preferentially absorbing or interfering with the penetration of the curing radiation into the uncured composition.

Typical additives will include volatile solvents such as acetone, methylethyl ketone, methanol, ethanol and the like, anti-oxidants, actinic radiation cure initiators such as benzophenones, benzoins and others known in the art, flow control agents such as the organic silicones, reactive diluents for viscosity lowering to provide greater ease in film spreading such as di-(5-ethyl-5-hydroxymethyl-2-vinyl-m-dioxane)-adipate and the like.

The following Examples further illustrate the best mode contemplated by the inventors for the practice of their invention.

EXAMPLE 1

5-Ethyl-5-Hydroxymethyl-2-Vinyl-m-Dioxane

Following a procedure analogous to that disclosed and referenced by Ikeda in U.S. Pat. No. 3,010,923 there is obtained from trimethylol propane and acrolein the title product in 80% yield, B. Pt. (1.75-2.7 mm) 100°-108° C., $n_D^{25}$ 1.4710

Analysis For: $C_9H_{16}O_3$: Calculated C, 62.77; H, 9.36; OH No., 325.7. Found C, 62.17; H, 10.40; OH No., 316.3 (Corr.). Acid No. (Found) 0.15.

EXAMPLE 2

4-Hydroxymethyl-2-Vinyl-1,3-Dioxolane and 5-Hydroxy-2-Vinyl-m-Dioxane

Following a procedure analogous to that referenced in Example 1 there is obtained the title products as a mixture in 62% yield, B. Pt. (13-11 mm) 100°-106° C.

Analysis For: $C_6H_{10}O_3$: Calculated: C, 55.37; H, 7.75; OH No. 431.1. Found: C, 55.46; H, 6.88; OH No. 423.7 (Corr.). Acid No. (Found) 0.12.

EXAMPLE 3

Toluene Diisocyanate Terminated Polyethylene Adipate End Capped With 5-Ethyl-5-Hydroxymethyl-2-Vinyl-m-Dioxane A hydroxyl terminated polyethylene adipate having an initial molecular weight of 800 was treated with toluene diisocyanate to an NCO content of 2.91%. This compound was treated with the product of Example 1 at an OH/NCO ratio of 1.05 for 9.5 hours at 90° C., in the presence of 0.02% phenothiazine as a polymerization inhibitor. The final NCO content was 0.53%.

Unsaturation: (Equivalents/100 g) (By ICI titration, 2 equivalents equal to 1 mole >C=C<)
Calculated: 0.13. Found: 0.145.

EXAMPLE 4

Toluene Diisocyanate Terminated Polyester End Capped With a Mixture of 4-Hydroxymethyl-2-Vinyl-1,3-Dioxolane and 5-Hydroxy-2-Vinyl-m-Dioxane Following a procedure analogous to that of Example 3 treat the toluene diisocyanate terminated polyethylene adipate polyester prepared in that Example with the product of Example 2 for 6.5 hours at 90° C. to give the title product. The final NCO content was 0.31%.

Unsaturation: (ICI titration, equiv./100 g)
Calculated: 0.125. Found: 0.145.

EXAMPLE 5

Formulations of Vinyl Acetal End Capped Polyesters and Polythiols and Polymers Thereof Formulations of the vinyl acetal end capped product of Example 3 and polythiols were prepared as follows:

| Ingredient | Formulation: (Parts by Weight) | |
|---|---|---|
| | A | B |
| Vinyl acetal end capped polyester | 85 | 86.2 |
| Methyl ethyl ketone | 62 | 62 |
| 2,6-di-t-butyl-4 methyl-phenol | 0.050 | 0.050 |
| Pentaerithrytol tetrakis (mercapto acetate) | 7 | 3.5 |
| $CH_2(OCH_2CH_2SH)_2$ | — | 3.0 |
| Benzophenone | 1.5 | 1.5 |
| UCC L-7602 (Union Carbide Corp.-Organo. Silicone) | 1 | 1 |

Films of the above formulations were cast as a methyl ethyl ketone solution and air dried prior to cure. After cure, film thickness was 4 mil. Curing was 2 passes at 20 feet per minute using a QC 1202 AN Processor (PPG Industries Inc., Radiation Polymer Co.) under two 12 in. lamps having a linear power density of 200 watts per inch. These compositions also cured slowly on exposure to air.

Properties obtained after U.V. cure as above are:

| | A | B |
|---|---|---|
| Elongation (%) | 470 | 410 |
| Tensile Strength (psi) | 1470 | 150 |
| Modulus (psi) | | |
| 100% | 90 | 45 |
| 200% | 165 | 65 |
| 300% | 300 | 100 |
| 400% | 500 | — |

The subject matter which applicants regard as their invention is particularly pointed out and distinctly claimed as follows:

1. A photocurable composition which comprises a polythiol and a polyene derived from a vinyl acetal.

2. A composition as defined in claim 1 wherein the vinyl acetal is a vinyl-1,3-dioxane or a vinyl-1,3-dioxolane.

3. A composition as defined in claim 2 wherein the polythiol is selected from a compound of the formula: $Q(SH)_m$ wherein m is at least 2 and Q is an m valent radical derived by removal of hydrogen from terminal or ring positions of straight, branched chain, or cyclic alkyl of from 2 to 20 carbon atoms, straight or branched chain alkyl-phenyl, diphenyl, phenyl- straight or branched chain alkylene-phenyl, diphenyl ether, straight, branched chain, or cyclic alkyl-phenyl ether, di-straight or branched chain, or straight or branched chain alkyl substituted cyclic alkylether, polyphenylene-polyether, polyphenylene-polyalkylene polyether, polyalkylene polyether, polyester, or ester of a polyol.

4. A composition as defined in claim 3 wherein the polyene is a compound of the formula:

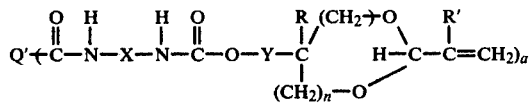

wherein Q' is an a valent residue derived from a hydroxyl terminated polyester, polyether, polyamide, polyester-polyether, or polyester-polyamide by removed of hydrogen from the hydroxyl functions; X is a divalent alkylene or arylene linking group; Y is a covalent bond or an alkylene group of 1-20 carbon atoms; R is hydrogen, alkyl of 1 to 20 carbon atoms, or haloalkyl of 1 to 20 carbon atoms; R' is hydrogen, alkyl of 1 to 20 carbon atoms, haloalkyl of 1 to 20 carbon atoms, fluoro or chloro; n is 0 or 1 and a is a positive number greater than 1.

5. A composition as defined in claim 4 wherein Q' is derived from a hydroxyl terminated polyester.

6. A composition as defined in claim 4 wherein the polythiol is a thiol terminated polyester, polyether, dialkyl formal, or ester of a polyol.

7. A composition as defined in claim 5 wherein the polythiol is a thiol terminated polyester, polyether, dialkyl formal, or ester of a polyol.

8. A composition as defined in claim 7 wherein the thiol terminated ester of a polyl is pentaerythritol tetrakis mercaptoacetate.

9. A composition as defined in claim 7 wherein the thiol terminated dialky formal is bis-(2-mercaptoethyl)-formal.

* * * * *

UNITED STATES PATENT OFFICE
CERTIFICATE OF CORRECTION

Patent No. 4,182,848          Dated January 8, 1980

Inventor(s) Claude J. Schmidle; Robert Barclay, Jr.

It is certified that error appears in the above-identified patent and that said Letters Patent are hereby corrected as shown below:

Column 1, line 52, "wherin" should read -- wherein --.

Column 2, line 19, ":" should be -- ; --.

Column 3, line 52, period (.) should be -- , -- (comma).

Column 4, line 43, "case" should read -- ease --.

IN THE CLAIM SECTION

Column 6, line 63, "polyl" should read -- polyol --.

Column 6, line 66, "dialky" should read -- dialkyl --.

Signed and Sealed this

Third Day of February 1981

[SEAL]

Attest:

RENE D. TEGTMEYER

Attesting Officer     Acting Commissioner of Patents and Trademarks